United States Patent

Müller-Blech et al.

[11] Patent Number: 6,152,646
[45] Date of Patent: Nov. 28, 2000

[54] FASTENING DEVICE

[75] Inventors: Ralf Müller-Blech, Neustadt; Erik Langmann; Christoph Buchta, both of Coburg; Ottmar Hütter, Meeder; Thomas Fröbig, Coburg, all of Germany

[73] Assignee: Brose Fahrzeugteile GmbH & Co. KG, Coburg, Corburg, Germany

[21] Appl. No.: 09/171,873

[22] PCT Filed: Apr. 24, 1997

[86] PCT No.: PCT/DE97/00850

§ 371 Date: Jan. 11, 1999

§ 102(e) Date: Jan. 11, 1999

[87] PCT Pub. No.: WO97/40994

PCT Pub. Date: Nov. 6, 1997

[30] Foreign Application Priority Data

Apr. 30, 1996 [DE] Germany ............... 196 19 087

[51] Int. Cl.$^7$ ...................................... E05F 11/38
[52] U.S. Cl. ................. 403/408.1; 403/334; 403/329
[58] Field of Search ................. 403/408.1, 334, 403/326, 329, 258, 260, 256, 404, 257; 49/375, 358, 352; 411/182, 338, 339

[56] References Cited

U.S. PATENT DOCUMENTS

| 4,607,456 | 8/1986 | Shiraishi et al. | 49/352 |
| 5,457,384 | 10/1995 | Alfors | 403/256 |
| 5,502,926 | 4/1996 | Grace et al. | 49/375 |
| 5,729,930 | 3/1998 | Schust et al. | 49/375 |

FOREIGN PATENT DOCUMENTS

| 0684393 | 11/1995 | European Pat. Off. |
| 3923444 | 1/1991 | Germany. |
| 4319705 | 12/1994 | Germany. |

*Primary Examiner*—Lynne H. Browne
*Assistant Examiner*—John R. Cottingham
*Attorney, Agent, or Firm*—Christie, Parker & Hale, LLP

[57] ABSTRACT

The invention relates to a device for fixing a plastic housing of an adjuster device for motor vehicles at a fastening point formed by a through hole in a supporting part of the vehicle body. A second plastic housing is mounted on the side of the through hole remote from the plastic housing whereby one of the two plastic housings has a stud which projects through the through hole into the recess with which the other of the two plastic housings is provided and which encloses the stud and whereby the two plastic housings are connected together so that the supporting part is clamped in between same.

1 Claim, 2 Drawing Sheets

FASTENING DEVICE

FIELD OF THE INVENTION

The invention relates to a device for fastening a plastic housing of an adjuster device for motor vehicles on a supporting part of a vehicle body.

BACKGROUND OF THE INVENTION

The adjuster devices provided in a vehicle are as a rule fixed on supporting parts of the vehicle body. It is thereby often necessary to fix a plastic housing (e.g., a motor casing) on a structural part (e.g., a door inner panel) which consists of a more dimensionally stable material. These connections between the component parts are preferably formed as screw connections so that the components of the adjuster device can be removed from the supporting part of the vehicle body for the purposes of repair.

In the case of connections for component parts of this kind there is the problem that plastic shrinks through material ageing and deforms under the effects of temperature whereby the connection can become loose. Play then arises in the fixing of the corresponding structural assembly of the adjuster device. If this is for example the drive motor of a window lifter mounted in a plastic casing then the loosened fixing of the motor casing leads to premature wear and produces unacceptable knocking noises during operation.

In order to overcome this problem it is known from German Offenlegungsschrift DE 43 19 705 Al to press into the plastic structural element a press-in nut made of shape-stable material and to fix this on the vehicle body by means of screws and a distance member which likewise consists of a material of high shape stability and is supported on one side on the press-in nut and on the other side is supported on the supporting component part of the vehicle body.

This technical instruction does indeed allow a secure fastening of a structural element made of plastic on a supporting component part of the vehicle body but does however have the drawback that its manufacture is very expensive. More particularly it is necessary to use as fixing means in addition to the usual screws also additional spacers and press-in nuts which first have to be pressed into the plastic element.

SUMMARY OF THE INVENTION

The object of the invention is to provide a device for fixing a plastic housing of an adjuster device for motor vehicles on a supporting part of a vehicle body wherein the device is manufactured as simply and as cost-effectively as possible and with which at the same time a permanent long-lasting connection between the plastic housing and support part is obtained.

The invention is based on the surprising knowledge that a very durable connection can be produced between a plastic housing and a supporting part of a motor vehicle made of a more dimensionally stable material if the plastic housing and the supporting part are fixed against each other by using a second plastic housing. To this end it is proposed to mount the second plastic housing on the side of the supporting part of the vehicle body remote from the first plastic housing and to connect the two plastic housings together through a through hole in the supporting part by means of suitable connecting means so that the supporting part of the vehicle body is clamped between the two plastic housings. It is thereby additionally provided that one of the two plastic housings has a stud which engages through the through hole in the supporting part and is enclosed by a recess with which the other of the two plastic housings is provided.

By boxing the plastic housings inside each other (the stud of the one plastic housing is pushed into the recess of the other plastics housing) a very simple quick-fit closed connection is produced wherein the two plastic housings can be supported directly against one another axially and/or radially (dependent on the design of the stud, which is produced for example according to the stress on the connection between the two parts). The two plastic housings moreover react in the same way to the effects of temperature and ageing so that the connection remains permanently stable also for these reasons. Loosening of the connection through a flow of plastic is avoided.

When testing the connection between the component parts according to the invention it has been seen that not only are the two plastic housings connected together very strongly but also that the fixing of the two plastic housings on the supporting part of the vehicle body remains permanently stable and does not loosen. This is achieved through the supporting part being clamped between two plastic housings which are connected together very securely.

This very durable connection does not require any additional dimensionally stable component parts (such as e.g. spacers) apart from a suitable connecting means (such as a screw). The weight as well as the manufacturing and material costs of the connection can thereby be reduced. Furthermore by using a plastic screw as connecting means it is possible to achieve in particular a very high tightening moment so that a correspondingly fixed connection is obtained.

With a preferred embodiment of the invention, the stud of the one plastic housing adjoins the inner wall of the recess of the other plastic housing both with its end face and with its sleeve face. The two structural elements can thereby be supported both axially and radially against one another.

The stud is preferably cylindrical and the recess is accordingly hollow cylindrical wherein the stud can be pressed more particularly without play into the through hole of the supporting part of the vehicle body.

With a preferred embodiment of the invention, it is further proposed that the two plastic housings are connected together detachably by the connecting means. This can be achieved for example in that the connecting means is formed as a plastic screw and the stud has an internal thread wherein the plastic screw is preferably mounted central relative to the through hole and the stud. With this embodiment of the invention, the connection between the component parts can be released for example at any time for the purposes of repair.

With some uses of the present invention it can be important that even if one of the two plastic housings is removed from the supporting part of the vehicle body by loosening the connection between the component part, the other plastic housing remains connected to the supporting part. In this case it is advantageous if the corresponding plastic housing is fixed on the supporting part by an additional fastening means. Generally no special demands are required of this additional fastening with regards to stability; it only serves for a provisional fixing between the corresponding plastic housing and the supporting part of the vehicle body. A detent element can thereby be provided for example as the additional fastening means and is preferably mounted on the stud of the corresponding plastic housing whereby the stud is held in the through hole of the supporting part.

The plastic housing which is to be fixed on a supporting part of the vehicle body can be a motor casing for a vehicle window lifter which is normally fixed on a support panel of the vehicle door.

Particularly advantageous is the use of the present invention for fixing the motor casing of a cable window lifter on a supporting part of the motor vehicle door wherein the cable outlet housing of the window lifter in which a cable drum is mounted is provided as the second plastic housing. In this case the motor casing and the cable outlet housing are fixed simultaneously on a supporting part of the vehicle body through the component connection according to the invention. Plastic screws or the like are required as the sole connecting means for this. The material required to form the stud on one of the structural elements is again spared in the case of a structural element provided with the recess. The component part connection is thereby characterized by small thicknesses. With this design of the invention the synergy effects which are possible when using the component part connection according to the invention are particularly evident.

The connection according to the invention between a plastic housing and a supporting part of the vehicle body is often provided at several fastening positions which are formed by a through hole in each supporting part in order to ensure sufficient stability of the component part connection particularly in the case of larger plastic housings.

Further advantages of the invention are apparent from the following description of an embodiment with reference to the drawings.

DETAILED DESCRIPTION OF THE INVENTION

Figure 1:
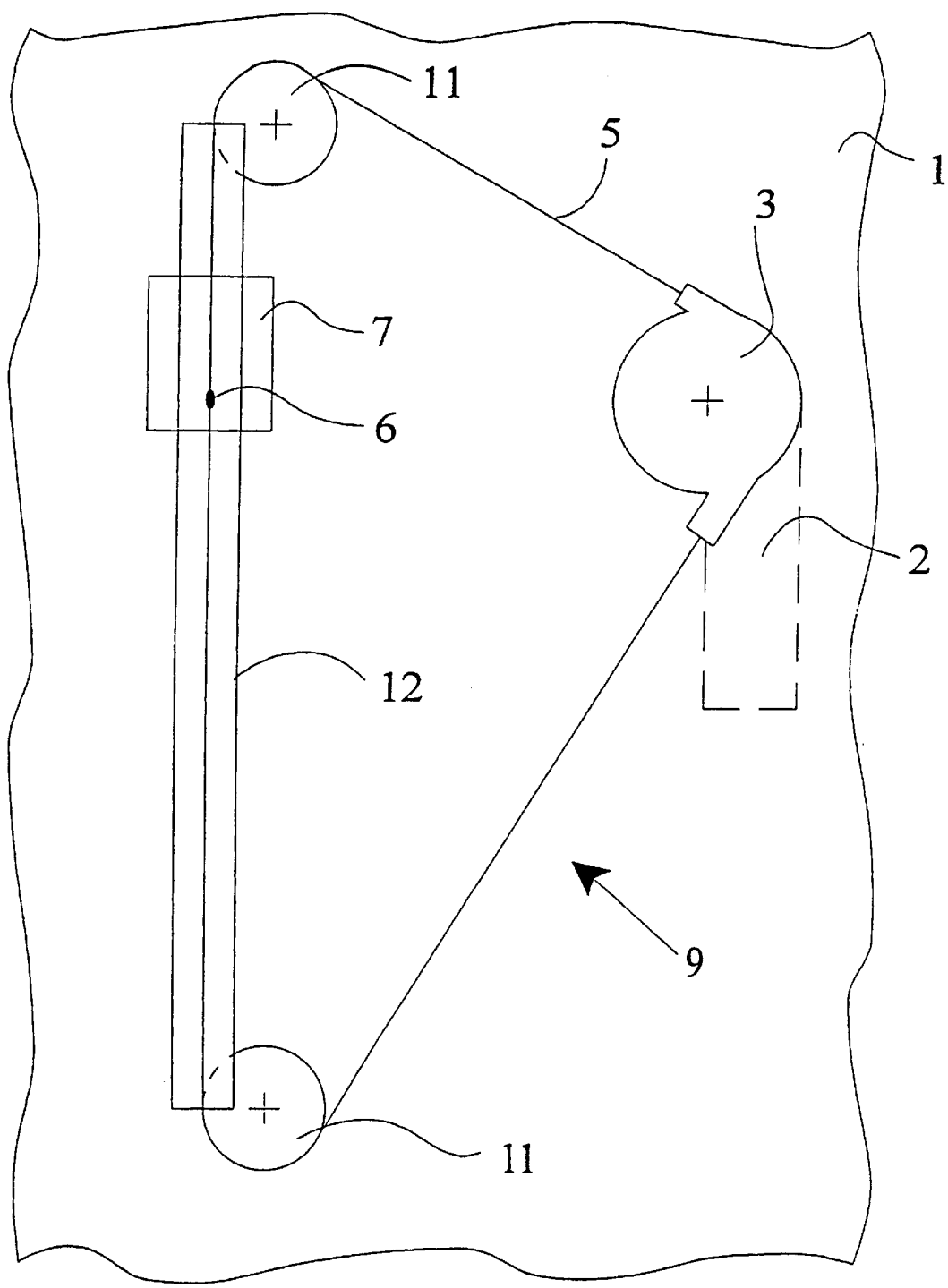
FIG. 1 is a diagrammatic illustration of a cable window lifter which can be fixed on a supporting part of a vehicle door by means of the device according to the invention.

FIG. 1 shows diagrammatically a cable window lifter 9 which is fixed on a support panel 1 of a motor vehicle door, such as for example the inner door panel or the support plate of a door module.

Figure 2:
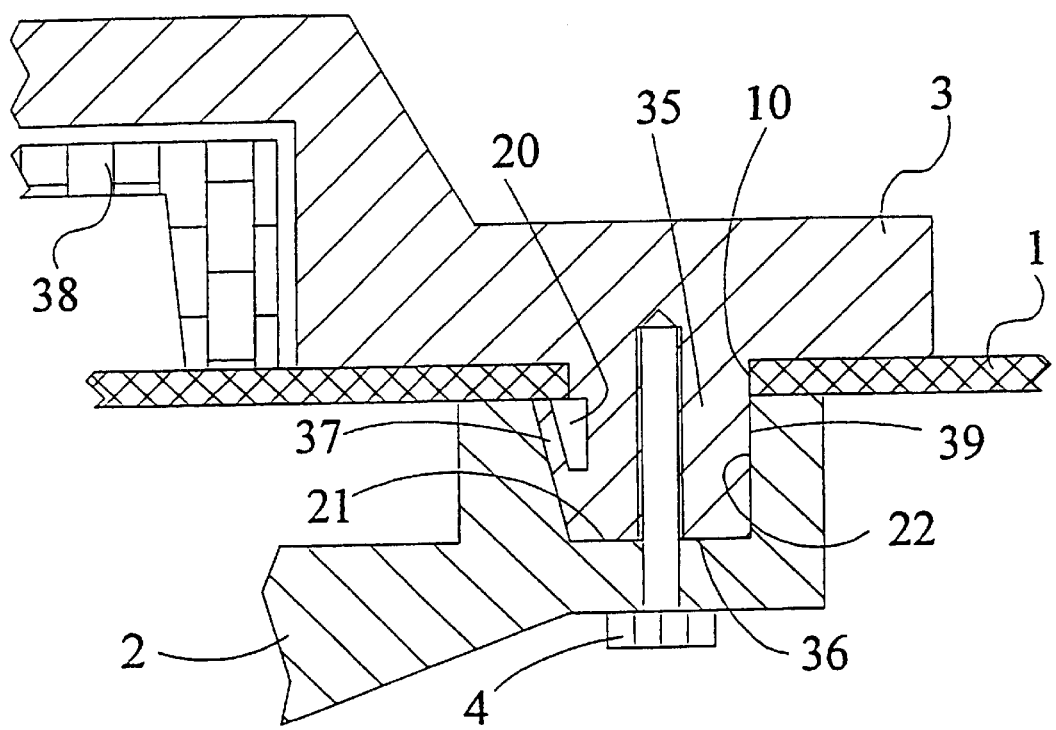
FIG. 2 Shows a preferred embodiment of the fastening device according to the invention.

The drive motor of this cable window lifter 9 is mounted in a housing 2 which is fixed by means of the fastening device according to the invention together with a cable outlet housing 3 on the support plate 1, cf. FIG. 2. The cable 5 of the window lifter 9 is guided through two cable pulleys 11 and is connected to an entrainment member 7 by a cable nipple 6 squashed with the cable 5. The entrainment member 7 on the one hand engages for displacement with a guide rail 12 extending along the displacement direction of the window pane (not shown) and on the other hand supports the window pane.

By turning the cable drum mounted in the cable outlet housing 3 to the right or left the entrainment member 7 is moved up and down respectively along the guide rail 12 whereby the window pane can be opened and closed.

FIG. 2 shows how the motor casing 2 and the cable outlet housing 3 can be fixed with particular advantage on the support plate 1 of a motor vehicle door using the fastening device according to the invention.

FIG. 2 shows a support plate 1 of a motor vehicle door which has a fixing point formed as a through hole 10 for the drive of a vehicle window lifter. The drive of the window lifter here comprises a motor (not shown) which is mounted in a motor casing 2 made of plastic, and a cable drum 38 which is driven by the motor and is mounted rotatable in a cable outlet housing 3 which is likewise made of plastic.

The cable outlet housing 3 has a substantially cylindrical stud 35 which passes through the through hole 10 of the support plate 1 and projects into a substantially hollow cylindrical recess 20 of the motor housing 2 formed by a sleeve. The stud 35 thereby lies on the one hand with its end face 36 against a base surface 21 of the sleeve and on the other hand with its outer sleeve face 39 against an inner wall 22 of the sleeve. The two plastic structural elements 2, 3 are thereby supported radially and axially directly adjoining one another. The motor casing 2 and the cable outlet housing 3 are furthermore detachably connected together by a plastic screw 4 which passes through a recess in the motor casing 2 and is screwed into an inner thread of the stud 35. The plastic screw 4 is tightened up so firmly that the support plate 1 is clamped between the motor casing 2 and the cable outlet housing 3. A very large tightening moment can be achieved by the plastic screw 4 so that where the head of the screw 4 adjoins the motor casing 2 a correspondingly large flat surface pressure is produced.

The support plate 1 can be a door panel through which the wet cell of the vehicle door is separated from the dry cell of the vehicle. In this case the motor casing 2 is as a rule mounted in the dry cell whilst the cable outlet housing 3 and the additional structural elements of the cable window lifter are located in the wet cell of the vehicle door.

If the drive motor of the window lifter has a defect it is very simple to remove the driver motor from the support plate 1 by loosening the plastic screw 4 and removing the motor casing 2 from the support plate 1. The window lifter motor can then be repaired or replaced by a new motor. The connection between cable outlet housing 3 and support plate 1 thereby remains; for the cable outlet housing 3 is additionally fixed on the support plate 1 by a keyed connection through a resilient detent element 37 mounted on the stud 35 whereby the detent element 37 engages behind the edge of the through hole 10 (safeguard against loss). As a result of this additional connection, the cable drum housing 3 is also held in its previous position on the support plate 1 even after removing the motor casing 2 and this prevents the cable of the cable window lifter from unwinding when the motor casing 2 is removed. After re-fixing the motor housing 2 it is therefore not necessary to make any new adjustment to the cable window lifter.

The component part connection shown in FIG. 2 is based on the connection of two plastic structural elements, namely the motor casing 2 and the cable outlet housing 3, by means of a screw 4 which likewise consists of plastic wherein the two structural elements 2, 3 are both fixed on a door panel 1. The structural elements 2, 3 can be connected together very securely by the plastic screw 4 without the danger of the component part connection coming loose through material aging or the effects of temperature; for the structural elements 2, 3 (and even the screw 4) are made of the same material (plastic) and, moreover through the boxing of the stud 35 and recess 20, are secured against the connection becoming loose through a flow of plastic.

The component part connection shown in FIG. 2 has in addition to its durability the advantage that it can be manufactured very easily. It is only necessary to insert the stud 35 of the cable outlet housing 3 into the through hole 10 of the door panel 1 and then set the sleeve 20 of the motor casing 2 onto the section of the stud 35 which projects out of the through hole 10. The fixing screw 4 is then inserted and tightened up.

A connection of this kind between the motor casing 2, the cable outlet housing 3 and the support plate 1 is produced as a rule at several fixing positions which are each formed by a through hole 10 in the support plate 1. The single fixing means required are thereby plastic screws 4 which are very lightweight economical component parts. This shows very clearly the considerable saving of material and assembly expense which can be achieved with the present invention. Compared to the fastening devices known from the prior art not only is there a saving of press-in nuts and spacers but also two structural elements of the window lifter can be fixed on the support plate 1 in one assembly process.

Further embodiments of the present invention are also conceivable. It is only important that two plastic structural elements are connected together by means of a suitable fastening means so that they are fixed at the same time on one supporting component part of the vehicle body.

What is claimed is:

1. A fastening device for fixing to a supporting part of a motor vehicle body, the fastening device comprising:

a first plastic housing;

a second plastic housing;

wherein one of the two plastic housings has a stud for projecting into a recess with which the other of the two plastic housings is provided and which encloses the stud;

wherein the two plastic housings are connectable together with a connecting means such that the supporting part is clamped between same; and wherein the two plastic housings are formed by a motor casing and a cable outlet housing of a cable window lifter.

* * * * *